(12) United States Patent
Ghetie et al.

(10) Patent No.: US 8,590,040 B2
(45) Date of Patent: Nov. 19, 2013

(54) RUNTIME PLATFORM FIRMWARE VERIFICATION

(75) Inventors: Sergiu D. Ghetie, Hillsboro, OR (US); Shahrokh Shahidzadeh, Portland, OR (US); Michael Neve de Mevergnies, Beaverton, OR (US); Adil Karrar, San Francisco, CA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 12/976,523

(22) Filed: Dec. 22, 2010

(65) Prior Publication Data

US 2012/0167205 A1 Jun. 28, 2012

(51) Int. Cl.
*G06F 21/00* (2013.01)
(52) U.S. Cl.
USPC .................................. 726/22; 713/1
(58) Field of Classification Search
None
See application file for complete search history.

(56) References Cited

U.S. PATENT DOCUMENTS

| 2003/0226006 A1* | 12/2003 | Ballard | 713/1 |
| 2006/0143600 A1* | 6/2006 | Cottrell et al. | 717/168 |
| 2008/0256526 A1* | 10/2008 | Ellsworth et al. | 717/168 |
| 2009/0007089 A1* | 1/2009 | Rothman et al. | 717/168 |

* cited by examiner

*Primary Examiner* — Jeffrey Pwu
*Assistant Examiner* — Nega Woldermariam
(74) *Attorney, Agent, or Firm* — Blakely, Sokoloff, Taylor & Zafman LLP

(57) ABSTRACT

Embodiments of the invention are directed towards logic and/or modules stored in processor secure storage to determine whether a first platform firmware image (e.g., basic input/output system (BIOS), device read-only memory (ROM), manageability engine firmware) loaded onto a processor cache is valid. The processor executes the first platform firmware image if it is determined to be valid. If the first platform image is determined to be invalid, a second platform firmware image is located. If this platform firmware image is determined to be valid, the processor will execute said second platform image.
In some embodiments of the invention, the determination of whether the first platform firmware image is valid is based, at least in part, on verification of a digital signature associated with the first platform firmware image. The digital signature may be created, for example, from a private key, wherein the digital signature is verified via a public key.

18 Claims, 4 Drawing Sheets

RUNTIME PLATFORM FIRMWARE VERIFICATION

FIELD

Embodiments of the invention generally pertain to computing devices and more particularly to platform firmware verification.

BACKGROUND

Platform firmware includes the first set of instructions that are executed by a computer system. To protect this important set of instructions from attacks, current solutions guard the firmware image by making it part of the root of trust. The root of trust that originates from the platform hardware passes from the hardware to the software through the firmware of the platform. And thus the firmware becomes a critical part of the chain of trust.

Methods of compromising platform firmware are continually being developed. Compromising platform firmware enables an arsenal of very useful tools to attack a system. Unlike software attacks, compromised firmware is both hard to detect and difficult for a system to recover from. Compromised firmware is mostly invisible to the software layer of a system, including most anti-virus and spyware tools. The invisible nature of firmware makes it ideal for rootkits. Rootkits are compact and dormant malicious hooks in the platform that attain highest possible privilege and lowest visibility to running software. Their primary function is to provide an API to other viruses and worms on an infected system.

Furthermore, the potential damage from a malicious firmware attack is far worse than a software attack due to the persistent nature of the firmware. For example, a denial of service (DOS) attack on the system software stack may result in a corrupted OS stack that would need to be reinstalled. In contrast, a compromised firmware DOS attack may result in a completely unbootable and unusable platform. Current technologies have very poor mechanisms for recovery of platform firmware.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention are directed towards modules and/or logic executed via a processor to determine whether a first platform firmware image loaded onto a processor cache is valid. Said first platform firmware image may be, for example, a basic input/output system (BIOS), device read-only memory (ROM) or manageability engine firmware. The processor executes the first platform firmware image if it is determined to be valid. If the first platform image is determined to be invalid, a second platform firmware image (alternatively referred to herein as a platform firmware recovery image or a "golden copy") is located. The processor will execute this second platform image if it is determined to be valid.

In some embodiments of the invention, the determination of whether the platform firmware images are valid is based, at least in part, on a verification of a digital signature. The digital signature may be created, for example, from a private key, wherein the digital signature is verified via a public key.

"Public/private keys" describe a set of cryptographic keys used for public-key cryptography. The key pair consists of a "public key" and a "private key". The key pair may be used for encryption, in which case the public key is used for encrypting data, and the private key used for decrypting the data. The key pair may also be used for digital signatures, in which case the private key is used for signing a message and the public key is used for verifying the message. As used herein, a "public key" is the public half of a key pair. Among other uses, a public key may be used to encrypt data to ensure that it may only be decrypted by an entity holding the corresponding private key, or may be used to verify a signature created by an entity holding the private key. As used herein, a "private key" is the private or secret half of a key pair. Among other uses, a private key may be used to decrypt data that has been encrypted with the corresponding public key, or may be used to digitally "sign" an item.

In some embodiments of the invention, the second platform firmware image is located in system nonvolatile memory. Thus a link between the processor and the system nonvolatile memory is established to enable the processor to access the second platform firmware image. The processor may execute the second platform image from the system nonvolatile memory, or may load the second platform firmware image to the processor cache, and execute the image from the processor cache.

Figure 1:
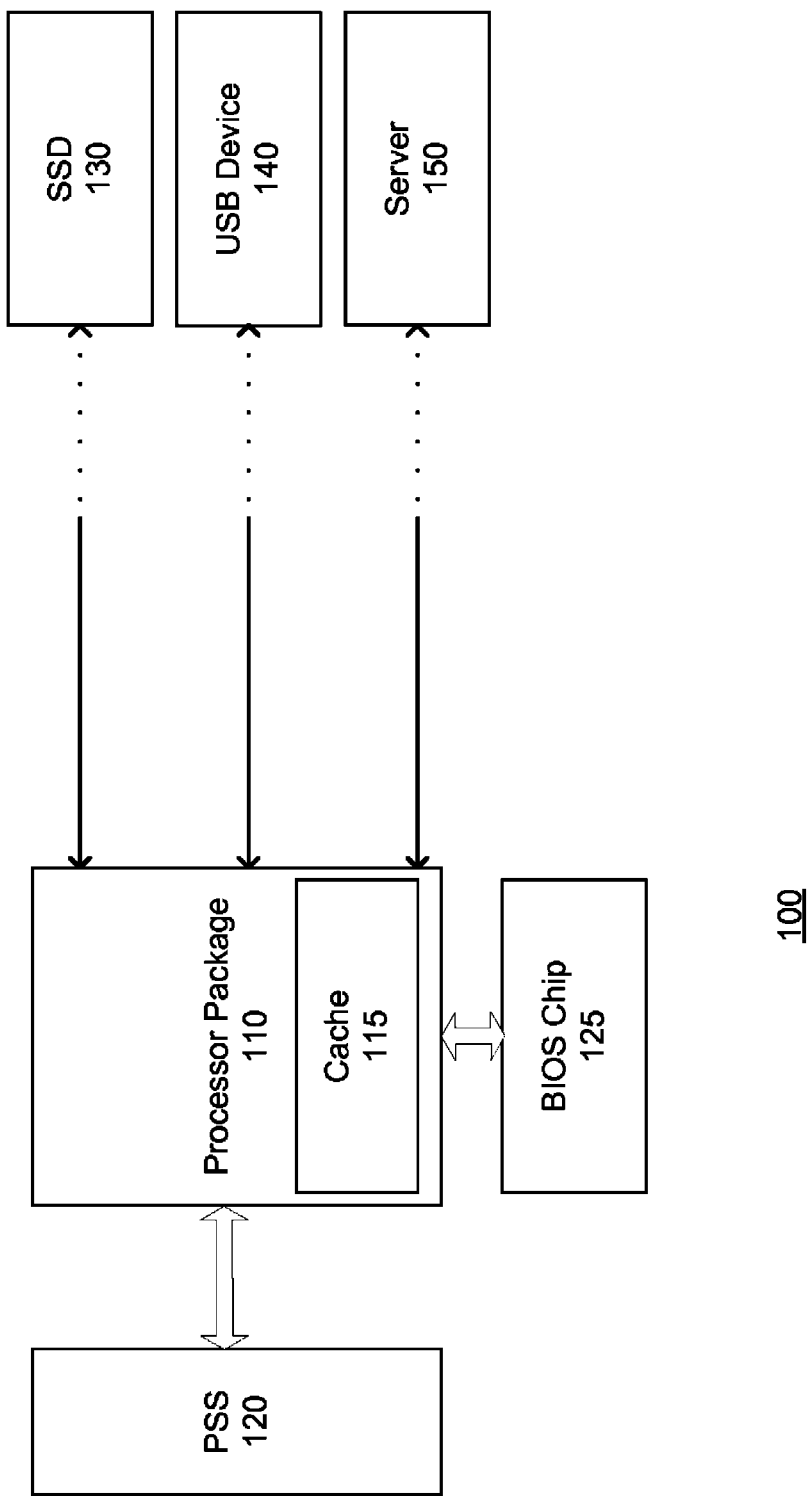
FIG. 1 is a block diagram of an embodiment of the invention.

FIG. 1 is a block diagram of an embodiment of the invention. In this embodiment, system 100 includes processor package 110 that is operatively coupled to nonvolatile processor storage (NPS) 120. NPS 120 is nonvolatile memory storage (e.g., NVRAM) that includes processor firmware (e.g., boot strap code, x86 instructions) and is securely accessible by processor package 110 via, for example, an Inter-Integrated Circuit (I2C) interface or an RF interface In FIG. 1, NPS 120 and processor package 120 are shown to be different components, and may be, for example, different components on the same silicon package, or separate silicon packages coupled together. In other embodiments, NPS 120 may be integrated into processor package 110.

FIG. 1 further includes BIOS chip 125, which includes a BIOS image. As discussed above, said BIOS image is an example of platform firmware that may be verified by embodiments of the invention. In this embodiment, processor package 110 executes processor firmware included in NPS 120 to perform digital signature verification of the BIOS image included in BIOS chip 125 and loaded into processor cache 115. If digital signature verification passes, processor package 110 executes said BIOS image; however, if the digital signature verification fails, the BIOS image is determined to be invalid (e.g., corrupted). The invalid BIOS image may be the result of an attack, data corruption or an unknown exploited vulnerability present in system 100.

Once processor package 110 detects that the BIOS image is invalid, it executes the processor firmware stored on NPS 120 to search for a "golden copy" of the system BIOS image. In one embodiment, the processor firmware may search system nonvolatile memory—i.e., solid-state drive (SSD) 130, wherein said processor firmware includes instructions to initialize the corresponding Serial Advanced Technology Attachment (SATA) link and find the golden copy of the BIOS image. In one embodiment, said golden copy of the BIOS is stored on a private partition of SSD 130.

The processor firmware may alternatively search for the golden copy of the BIOS image on USB device 140, or may establish a remote connection to secure server 150 to procure a golden copy of the BIOS for the system.

Thus, it is to be understood that embodiments of the invention bring the root of trust inside the processing core of system 100 and significantly reduce the likelihood of a firmware attack. It does not matter how the BIOS image of BIOS chip 125 is corrupted—processor 110 will reject the execution of the code and execute the processor firmware stored in NPS 120 to fetch a golden copy of the BIOS image. In contrast, prior art solutions focus on securing the update mechanism of some of the firmware components and allow invalid firmware into the root of trust. By excluding the platform firmware from the root of trust until it is authenticated, system 100 is protected against attacks such as rootkits. Furthermore, it is to be understood that embodiments of the invention protect systems against vulnerabilities in 3rd party firmware components, such as graphics firmware (option ROM), that run as part of the boot sequence.

To further enhance the security of system 100, embodiments of the invention may further provision the contents stored in NPS 120, including the processor firmware described above and any data used for the verification (e.g., a public key) of platform firmware such as the above described BIOS image of BIOS chip 125.

In one embodiment, the Original Equipment Manager (OEM) of system 100 provisions the contents of NPS 120. The interface used by processor 110 to access NPS 120 may be guarded using an access password or key. Additionally, said interface may be disabled before the end user receives the system. Furthermore, the contents of NPS 120 may either be secured or/and authenticated before they are relied upon. Securing the OEM specific public key and processor firmware may be accomplished, for example, by storing signed processor firmware (using an OEM private key) and a signed OEM public key (or hash of it—signed using a private key for the processor manufacturer). Securing the OEM specific public key and processor firmware may also be accomplished by storing plaintext processor firmware and the public key in NPS 120 securely during provisioning. The contents of NPS 120 may then be communicated to processor package 110 using an encrypted interface (e.g., an Advanced Encryption Standard (AES) I2C interface).

Figure 2:
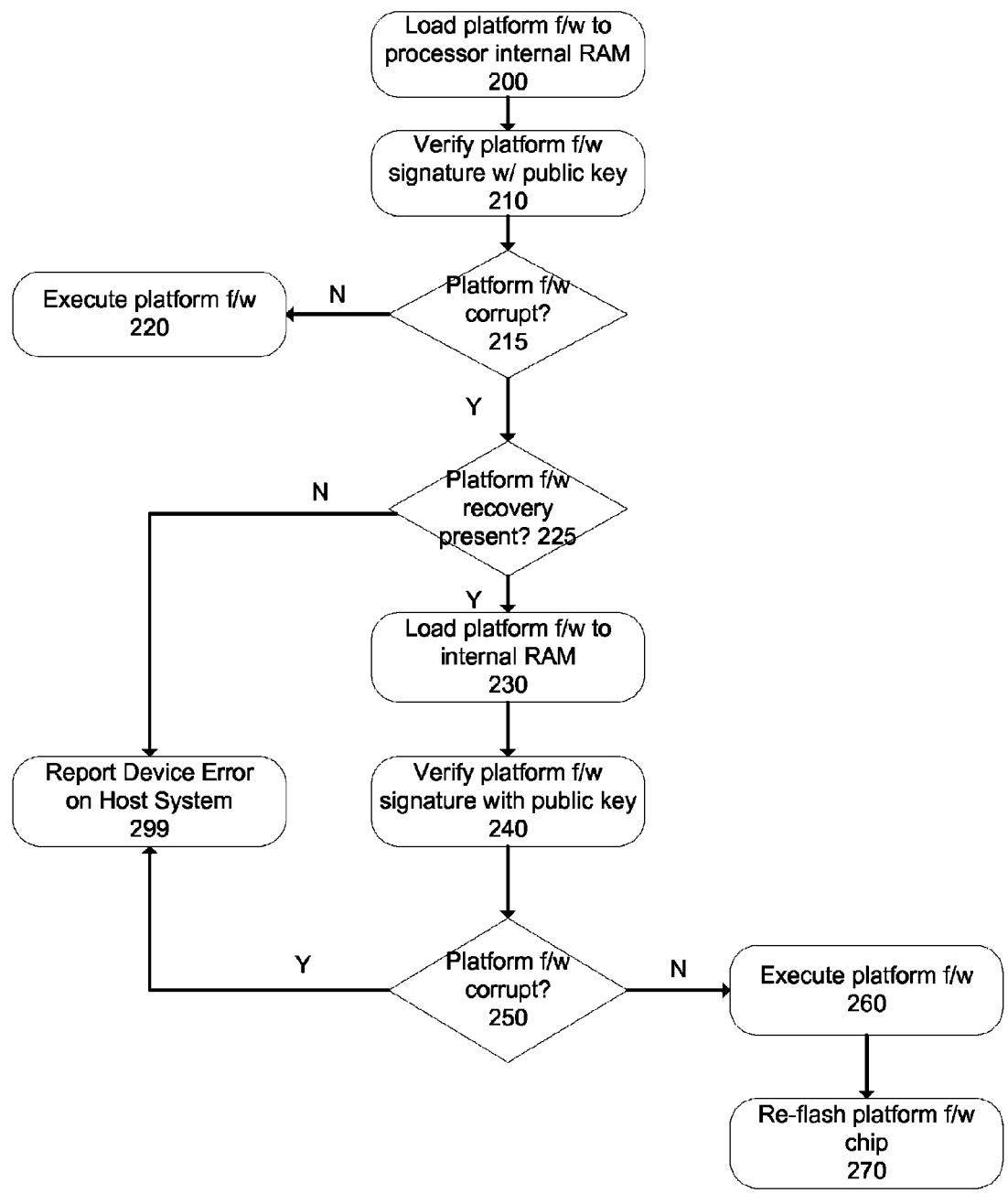
FIG. 2 is a flow chart of an embodiment of the invention to verify platform firmware.

FIG. 2 is a flow diagram illustrating an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

In this embodiment, out of reset and after initializing a processor package (e.g., a μcore and the core processors), a system processor (i.e., any combination of the initialized core processors and any co-processor in the system) executes processor firmware microcode (herein referred to as μcode) that is stored in nonvolatile processor storage. Said processor firmware includes instructions to load a first platform firmware image into the processor internal RAM or cache, 200. The μcode may also include instructions to load a public key, stored in the nonvolatile processor storage, for subsequent verification operations. After loading the first platform firmware image into the processor cache, the μcode includes instructions to execute a digital signature verification on the platform firmware image using the public key extracted from the nonvolatile processor storage, 210. If the digital signature verification passes, 215, the platform firmware image is considered authentic and the processor starts booting the system using the platform firmware image, 220.

If the digital signature verification fails, the platform firmware image is considered invalid and a determination is made if a second platform firmware image—i.e., a platform firmware recovery image, is present, 225. If a platform firmware recovery image is not found, the corrupted platform firmware image is not executed and a system error is reported, 299. As described above the platform firmware recovery image may be stored in a private partition on system nonvolatile memory, in a USB device operatively coupled to the system, or remotely on a secured server. Said platform firmware recovery image may also be signed. Once the processor finds the golden copy of the platform firmware it loads the platform firmware again to the internal processor caches, 230 and executes a digital signature verification on the platform firmware to ensure that the golden copy is valid, 240. If the golden copy is valid, 250, the processor starts initializing the system using the golden copy and boots normally, 260. If the golden copy is invalid, a system error is reported, 299.

In one embodiment the processor always boots from the golden copy stored in the system nonvolatile memory after the initial boot. It is to be understood that this booting process allows for faster boot into the Operating System due to the higher bandwidth buses between the processor and the system nonvolatile storage (e.g., 200-500 MHz's) vs. the processor and the firmware devices (e.g. SPI flash—3 MHz's). A platform firmware chip that includes the invalid platform firmware image may optionally be re-flashed, 270.

Thus, embodiments of the invention may execute a process that includes operations for authenticating all platform firmware inside the processor before executing it, fetching instructions from a NVRAM device operatively coupled to or included in the processor if the authentication fails, and execute an auto-recovery (i.e., without user intervention) from a back-up golden copy on a system nonvolatile memory storage.

Figure 3:
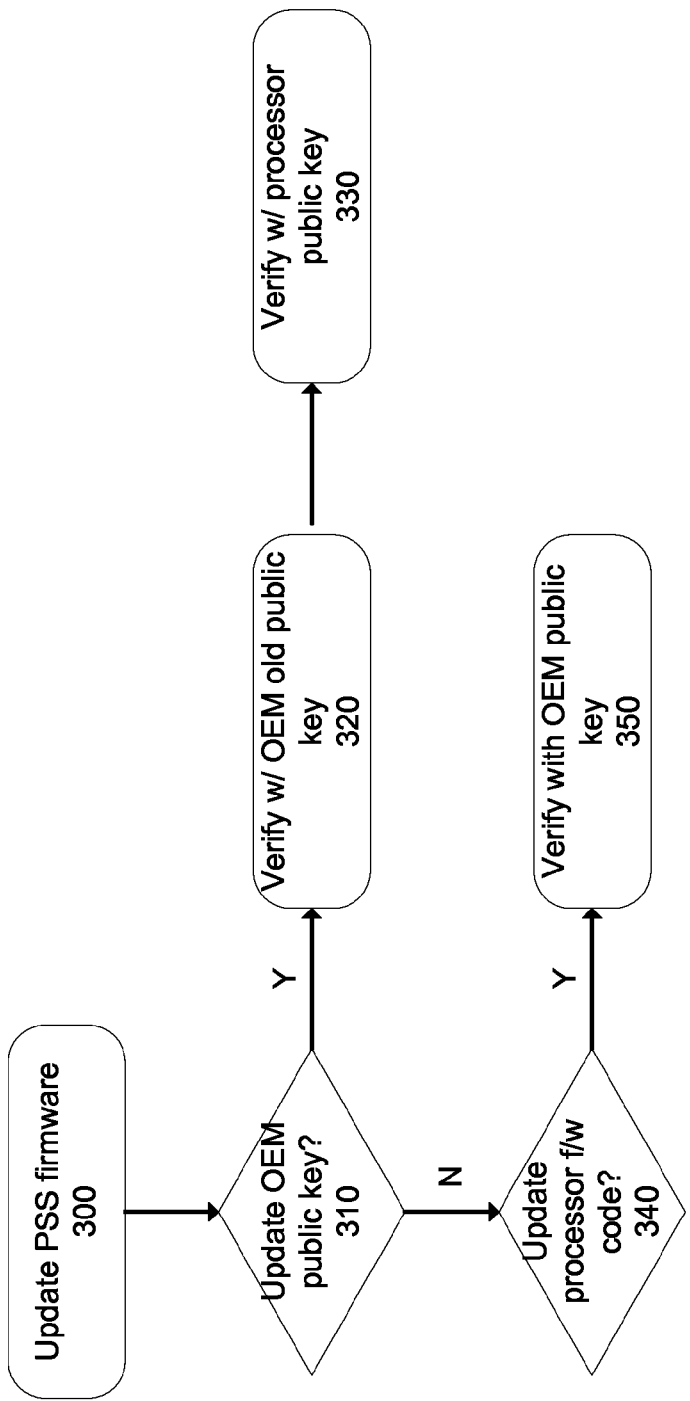
FIG. 3 is a flow chart of an example process to update processor firmware stored in nonvolatile processor storage.

FIG. 3 is a flow diagram on an example process to update processor firmware stored in nonvolatile processor storage as described above. A system OEM may require an update to the processor firmware, 300, in instances where there are bugs or errors in the code or there are new updates or configuration changes that require updates.

If the OEM public key of the processor firmware needs to be updated, 310 (e.g., due to a compromised key or as a mechanism of revocation), the updated OEM public key needs to be verified. Specifically, the new OEM public key may be verified to be signed by the previous OEM public key and a processor public key. For example, the processor may perform a digital signal verification using the old OEM public key to ensure that the new public key is authorized by the same OEM that owns the old public/private key pair, 320. The processor may further perform a digital signature verification using the processor public key to confirm that the new OEM platform key is recognized as a valid OEM key, 330. Once the authenticity of the new OEM public key is verified, the new OEM public key along with the processor signature is written into the nonvolatile processor storage to replace the old OEM public key.

If the processor firmware included in the nonvolatile processor storage requires updating, 340, the update requires a signed image using the OEM private key. Before overwriting the old processor firmware image, the processor may perform a digital signature verification on the new processor firmware image with the OEM publickey to verify that it belongs to the OEM, 350.

Thus, it is to be understood that the contents of the nonvolatile processor storage cannot be updated by third party modules due to the use of OEM and processor keys. In one embodiment, only instructions included in the processor firmware are enabled to write to nonvolatile processor storage, using the I2C or RF interface.

Figure 4:
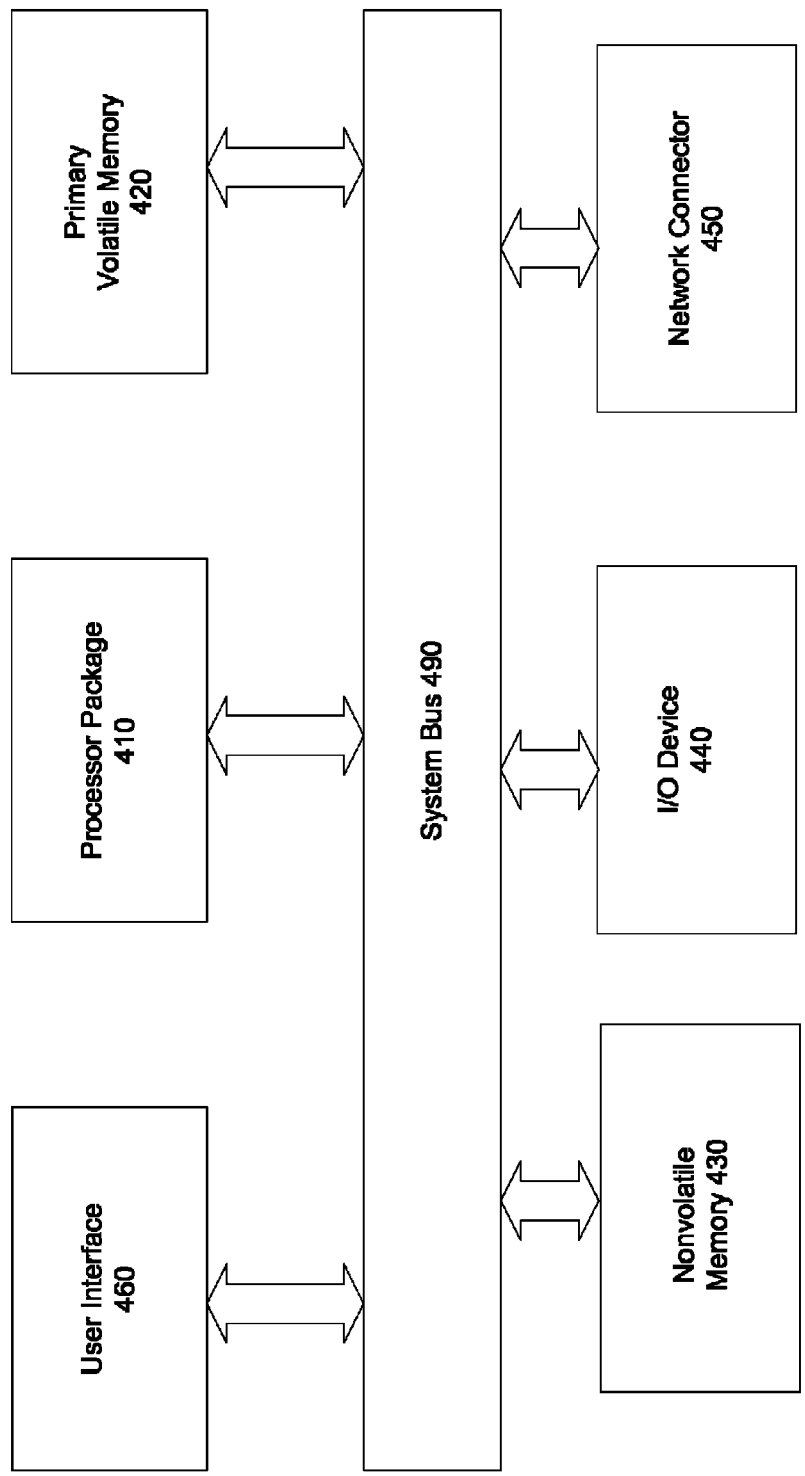
FIG. 4 is a block diagram of a system utilizing an embodiment of the invention.

FIG. 4 is block diagram of a system that may utilize an embodiment of the invention. System 400 may be included in, for example, a desktop computer, a laptop computer, a netbook, a notebook computer, a personal digital assistant (PDA), a server, a workstation, a cellular telephone, a mobile computing device, an Internet appliance or any other type of computing device.

System 400 may include processor package 410, which may include or be operatively coupled to nonvolatile processor storage as described above. Processor package 410 may exchange data, via system bus 490, with user interface 460, primary volatile memory 420, non-volatile memory 430, I/O device 440 and network connector 450.

Volatile memory 420 may comprise, for example, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 430 may comprise, for example, an SSD drive, flash memory, phase change memory (PCM), read-only memory (ROM), electrically erasable programmable read-only memory (EEPROM), or any other type of non-volatile memory device. Network connector 450 may comprise, for example, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any other form of wireless communication protocol.

Processor package 410 may securely access and execute processor firmware to verify platform firmware as described above. Backup platform firmware images may be stored in nonvolatile memory 430, or may alternatively be stored in an I/O device operatively coupled system 400, or a secure server accessible via network connector 450. In embodiments of the invention, other platform firmware components, such as graphics cards (option ROMs) and network cards, are also signed and public key owned by the OEM or will be provided by the firmware owner to provide a trusted source of firmware modules.

In one embodiment, a third party application such as an Anti-Virus (AV) provider may enumerate all the firmware devices on the platform and sign all firmware recovery images. The public key of the third party application may be stored on the nonvolatile processor storage. The procedures as above follow where the processor does a digital signature verification on all the firmware components before executing them using a unified public key provisioned in the nonvolatile processor storage as previously described.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:
   a processor including a cache;
   a first and a second nonvolatile storage accessible by the processor; and
   non-volatile processor storage including a firmware verification module executed exclusively by the processor to:
   load a first copy of a platform firmware image included in the first nonvolatile storage onto the cache included in the processor,
   determine whether the first copy of the platform firmware image loaded onto the cache included in the processor is valid, the processor to execute the first copy of the platform firmware image from the cache if the first copy of the platform firmware image is valid, and
   in response to determining the first copy of the platform firmware image is invalid, locate a second copy of the platform firmware image included in the second nonvolatile storage and determine whether the second copy of the platform firmware image is valid, the processor to load the second copy of the platform firmware image onto the cache included in the processor and execute the second copy of the platform firmware image from the cache if the second copy of the platform firmware image is valid, wherein the second nonvolatile storage including the second copy of the platform firmware image is included in an external device, the firmware verification module to further establish a link between the processor and the external device to locate the second copy of the platform firmware image.

2. The system of claim 1, wherein each of the first and second copies of the platform firmware image comprises a basic input/output system (BIOS) image, graphics card firmware image, device read-only memory (ROM), or manageability engine firmware.

3. The system of claim 1, wherein determining the first copy of the platform firmware image is valid is based, at least in part, on verifying a digital signature associated with the first copy of the platform firmware image, the digital signature created using a private key, the firmware verification module to verify the digital signature via a public key included in the first nonvolatile storage.

4. The system of claim 1, wherein the external device comprises a peripheral device.

5. The system of claim 4, wherein the peripheral device comprises a solid state drive (SSD), and the second copy of the platform firmware image stored in nonvolatile memory is stored in a private partition of the SSD.

6. The system of claim 1, wherein the external device comprises a server operatively coupled to the system.

7. The system of claim 1, wherein one of the contents of the second nonvolatile storage or an interface operatively coupling the processor and the second nonvolatile storage is encrypted.

8. The system of claim 1, wherein the first nonvolatile storage comprises a BIOS chip and is re-flashed with the second copy of the platform firmware image in response to determining the first copy of the platform firmware image is invalid and the second copy of the platform firmware image is valid.

9. A method comprising:
executing, via a processor, a firmware verification module included in non-volatile processor storage exclusively accessible by the processor, including:
loading a first copy of a platform firmware image included in a first nonvolatile storage onto a cache included in the processor;
determining whether the first copy of the platform firmware image loaded onto the cache included in the processor is valid;
in response to determining the first copy of the platform firmware image is valid, executing the first copy of the platform firmware image from the cache;
in response to determining the first copy of the platform firmware image is invalid, executing processor firmware to locate a second copy of the platform firmware image included in a second nonvolatile storage and determine whether the second copy of the platform firmware image is valid, wherein the second nonvolatile storage including the second copy of the platform firmware image is included in an external device, and wherein locating the second copy of the firmware image includes establishing a link between the processor and the external device to locate the second copy of the platform firmware image; and
in response to determining the second platform firmware image is valid, executing the second copy of the platform firmware image from the cache.

10. The method of claim 9, wherein each of the first and second copies of the platform firmware image comprises a basic input/output system (BIOS) image, graphics card firmware image, device read-only memory (ROM), or manageability engine firmware.

11. The method of claim 9, wherein determining the first copy of the platform firmware image is valid is based, at least in part, on a verification of a digital signature associated with the first copy of the platform firmware image, the digital signature created using a private key, the digital signature verified via a public key.

12. The method of claim 9, wherein the second nonvolatile memory storage comprises a peripheral device.

13. The method of claim 12, wherein the peripheral device comprises a solid state drive (SSD) and the second copy of the platform firmware image stored in the SSD is stored in a private partition of the SSD.

14. An article of manufacture comprising a non-transitory machine readable storage medium that provides instructions that, if executed by the machine, will cause the machine to perform operations comprising:
executing, via a processor, a firmware verification module included in non-volatile processor storage exclusively accessible by the processor, including:
loading a first copy of a platform firmware image included in a first nonvolatile storage onto a cache included in the processor;
determining whether the first copy of the platform firmware image loaded onto the cache included in the processor is valid;
in response to determining the first copy of the platform firmware image is valid, executing the first copy of the platform firmware image from the cache;
in response to determining the first copy of the platform firmware image is invalid, executing processor firmware to locate a second copy of the platform firmware image included in a second nonvolatile storage and determine whether the second copy of the platform firmware image is valid, wherein the second nonvolatile storage including the second copy of the platform firmware image is included in an external device, and wherein locating the second copy of the firmware image includes establishing a link between the processor and the external device to locate the second copy of the platform firmware image; and
in response to determining the second platform firmware image is valid, executing the second copy of the platform firmware image from the cache.

15. The article of manufacture of claim 14, wherein each of the first and second copies of the platform firmware image comprises a basic input/output system (BIOS) image, graphics card firmware image, device read-only memory (ROM), or manageability engine firmware.

16. The article of manufacture of claim 14, wherein determining the first copy of the platform firmware image is valid is based, at least in part, on a verification of a digital signature associated with the first copy of the platform firmware image, the digital signature created using a private key, the digital signature verified via a public key.

17. The article of manufacture of claim 14, wherein the second nonvolatile memory storage comprises a peripheral device.

18. The article of manufacture of claim 17, wherein the peripheral device comprises a solid state drive (SSD) and the second copy of the platform firmware image stored in the SSD is stored in a private partition of the SSD.

* * * * *